(12) United States Patent
Searle

(10) Patent No.: US 7,481,122 B2
(45) Date of Patent: Jan. 27, 2009

(54) APPARATUS FOR MEASURING TORQUE

(75) Inventor: Robert F. Searle, Amherst, NH (US)

(73) Assignee: Vibrac LLC, Amherst, NH (US)

( * ) Notice: Subject to any disclaimer, the term of this patent is extended or adjusted under 35 U.S.C. 154(b) by 0 days.

(21) Appl. No.: 11/974,532

(22) Filed: Oct. 15, 2007

(65) Prior Publication Data

US 2008/0092668 A1    Apr. 24, 2008

Related U.S. Application Data

(60) Provisional application No. 60/853,197, filed on Oct. 20, 2006.

(51) Int. Cl.
*B25B 23/14* (2006.01)
*G01L 3/00* (2006.01)
(52) U.S. Cl. .................. 73/862.23; 73/862.08
(58) Field of Classification Search .............. 73/862.08, 73/862.23
See application file for complete search history.

(56) References Cited

U.S. PATENT DOCUMENTS

| 3,495,452 A | 2/1970 | Johnson, Jr. et al. |
| 3,866,463 A | 2/1975 | Smith et al. |
| 3,902,374 A * | 9/1975 | Hoffman et al. ........... 74/5.6 D |
| 4,126,818 A | 11/1978 | Taylor |
| 4,212,196 A | 7/1980 | Krieger et al. |
| 4,295,320 A * | 10/1981 | Willingham ................. 53/201 |
| 4,384,493 A | 5/1983 | Grunbaum |
| 4,559,759 A | 12/1985 | Herbert |
| 4,565,295 A | 1/1986 | Mori et al. |
| 4,658,565 A | 4/1987 | Westbrook et al. |
| 4,671,421 A | 6/1987 | Reiber et al. |
| 4,696,144 A | 9/1987 | Bankuty et al. |
| 4,794,801 A | 1/1989 | Andrews et al. |
| 5,152,182 A | 10/1992 | Searle |
| 5,383,370 A | 1/1995 | Abramson et al. |
| 5,469,737 A * | 11/1995 | Smith et al. .................... 73/168 |
| 6,006,933 A * | 12/1999 | Henning et al. ............. 215/328 |
| 6,398,076 B1 | 6/2002 | Giblin et al. |
| 6,457,352 B1 | 10/2002 | Knestel |
| 6,471,909 B1 | 10/2002 | Czesak |
| 6,736,280 B1 | 5/2004 | Zapata |
| 6,841,117 B1 | 1/2005 | Smith et al. |
| 7,097,060 B2 | 8/2006 | Penny et al. |
| 2005/0052087 A1 | 3/2005 | Shinmura et al. |
| 2007/0113679 A1 | 5/2007 | Searle |

* cited by examiner

*Primary Examiner*—Max Noori
(74) *Attorney, Agent, or Firm*—Pandiscio & Pandiscio

(57) ABSTRACT

An apparatus is provided for accurately measuring the capping head torque exerted by bottle capping machines on screw-type plastic or metal caps when such caps are applied to bottles.

18 Claims, 10 Drawing Sheets

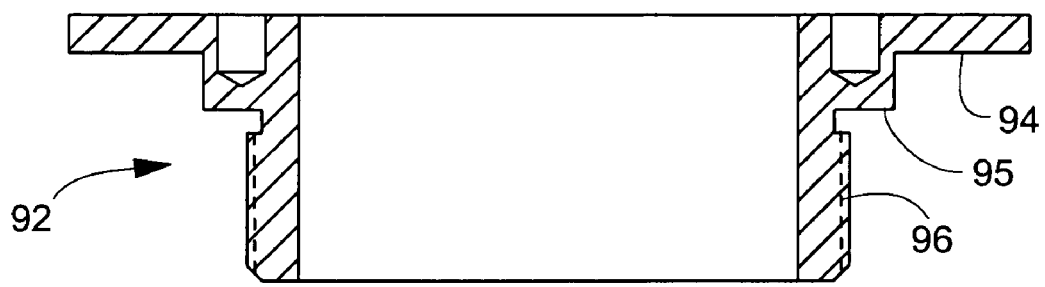
FIG. 10
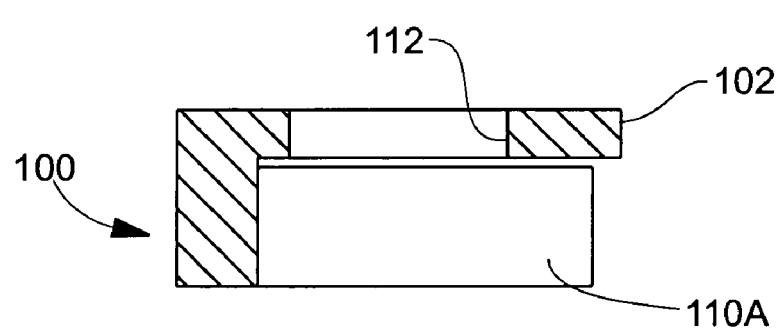
FIG. 13
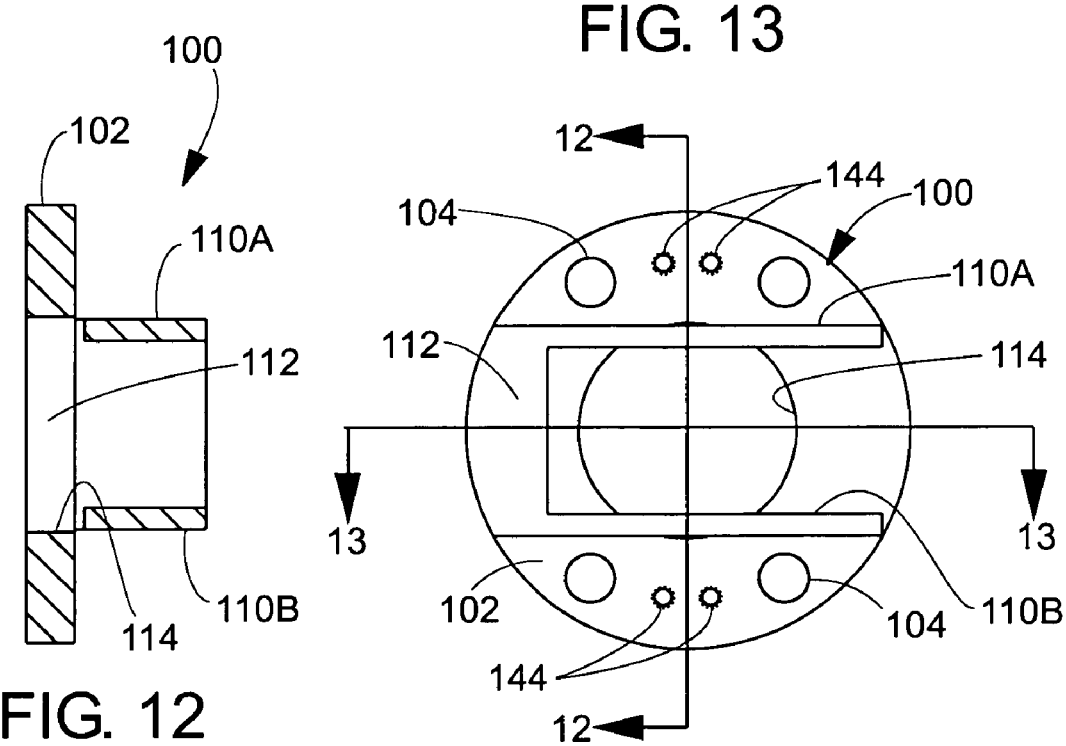
FIG. 12
FIG. 11

APPARATUS FOR MEASURING TORQUE

This application is based on and claims the benefit of my provisional application Ser. No. 60/853,197, filed Oct. 20, 2006.

This invention relates to torque measurement and more particularly to a novel and improved system and method for conducting torque measurements on screw closures for bottles and like containers, and also on nuts and bolts.

BACKGROUND OF THE INVENTION

Many different types of torque measuring devices have been produced for various applications, including devices for testing screw-type closures for bottles and other containers, nuts, bolts, and the like. See U.S. Pat. No. 5,152,182 for Torque Measuring Apparatus and my co-pending U.S. patent application Ser. No. 11/269,344, filed at Nov. 8, 2005 for Torque Measuring Apparatus, and the references cited therein. U.S. Pat. No. 5,152,182 and my co-pending U.S. patent application Ser. No. 11/269,344 are incorporated herein by reference.

With respect to the bottle capping industry, torque measuring devices are known which are designed to test for the amount of torque required to remove a screw closure. However, there exists a need for a device for testing the amount of torque that is applied to a cap by a capping machine when the cap is screwed onto a bottle or other like container by the capping machine. In particular there exists a need for a device for testing the torque with which a plastic or metal screw cap is applied to a flexible plastic bottle or other container by an automatic container capping machine. As used herein the term "bottle capping machines" means and includes machines for applying plastic or metal screw type caps, e.g., tamper evident caps, to round bottles of the kind that are used to contain carbonated beverages or other liquids, as well as caps for containers of other shapes that are used to hold a liquid or a particulate type commodity such as laundry detergent, soap, oil or other liquid or powder-like chemicals. As used herein the term "bottle" means and includes bottles made of plastic or glass having a body with a generally round cross-sectional configuration and a reduced diameter hollow neck which is closed off by a cap, e.g. carbonated beverage bottles, and also other containers that have a non-round configuration but are adapted to be closed off by a screw type cap, e.g. large mouth bottles used to hold liquid laundry detergent. As used herein, the term "cap" means and includes a screw type closure for a bottle or like container, with the screw type closure being designed to screw over or screw into the mouth of the bottle or other container. Of particular relevance to use of the present invention are screw caps with tamper-evident bands. Common containers with mouths that are internally threaded are exemplified by the 1 gallon capacity blow-molded large mouth plastic containers with integral handles that are used to hold liquid detergents or other laundry liquids. By way of example but not limitation, plastic and metal screw-type tamper-evident caps for beverage bottles are illustrated and described in the following U.S. Pat. No. 4,658,565, issued Apr. 21, 1987 to T. E. Westbrook et al; U.S. Pat. No. 6,736,280, issued May 18, 2004 to Felipe L. Zapata., and U.S. Pat. No. 4,565,295, issued Jan. 21, 1986 to F. Mori et al. Wide mouth containers are exemplified by the ones shown in U.S. Pat. No. 6,471,909, issued Oct. 29, 2001 to T. M. Czesak, and U.S. Pat. No. 6,841,117, issued Jan. 11, 2005 to M. L. Smith et al. Large blow molded containers are disclosed in U.S. Pat. No. 7,097,060, issued Aug. 29, 2006 to M. E. Penny et al. and U.S. Pat. No. 6,398,076, issued Jun. 4, 2002 to E. J. Giblin et al. Containers with screw-in caps are disclosed by Giblin et al. in U.S. Pat. No. 6,398,076, cited supra, and U.S. Pat. No. 4,671,421, issued Jun. 9, 1987 to T. L. Reiber et al. Further by way of example but not limitation, capping machines are illustrated by U.S. Pat. No. 4,658,565 to Westbrook at al., cited supra, and U.S. Pat. No. 4,559,759, issued Dec. 24, 1985 to James F. Herbert, and the prior art cited in those patents.

OBJECTS AND SUMMARY OF THE INVENTION

The primary object of the invention is to provide a new apparatus and method for accurately measuring the capping head torque exerted by bottle capping machines on screw-type plastic or metal caps when such caps are applied to bottles.

A further object of the invention is to provide an apparatus for the purpose described which can be advanced to the capping head in a capping machine and which is adapted to have a screw cap applied thereto by the capping head, with the apparatus comprising means for providing an output signal representative of the torque with which the cap is applied thereto.

A another object of the invention is to provide a torque measuring apparatus for the purpose described which is adapted to wirelessly transmit torque data to a remote receiver for subsequent processing and evaluation.

The apparatus provided by the present invention is a self-contained device that essentially comprises a housing, means attached to the housing for rotatively supporting a shaft so that one end of the shaft is disposed in the housing and the other end of the shaft protrudes from one end of the housing, a beam assembly disposed within the housing, said assembly comprising a pair of paralleled mutually spaced beams and means mounting said beams in cantilever fashion with said shaft extending between said beams, an arm attached to said shaft for rotation therewith, said arm being positioned between said beams whereby when said shaft is rotated, it will cause one beam or the other to be deflected according to the direction of rotation of the shaft, an encoder attached to the shaft within the housing for generating electrical signals responsive to rotation of said shaft, said signals providing a measure of the degree of rotation of said shaft, and electronic means coupled to the encoder and positioned within said housing for processing said signals and transmitting said processed signals wirelessly to an external receiver.

According to a preferred embodiment of the invention, the apparatus is configured in the shape of a selected style and size beverage bottle and the end of the shaft that protrudes from the housing is adapted to receive a screw cap designed for such beverage bottle, whereby the bottle-shaped apparatus may be accepted by the conveyor section of the capping machine used to cap such bottles and advanced into position for attachment of a screw cap by the capping machine. When a cap is screwed onto the protruding end of the shaft, the torque exerted by the capping machine on the cap is transmitted to the shaft, causing the latter to rotate against the resistance offered by the beam assembly, and the consequent rotation of the encoder by the shaft results in output signals being generated by the encoder. Those signals are processed and then transmitted wirelessly by the transmitter to a remote receiver for subsequent further processing and analysis of the data generated by the encoder.

Apparatus embodying the invention also may be adapted for use in measuring the torque with which screw caps are applied to containers that have a noncircular cross-sectional shape, or where, for example, the spout (mouth) of the container is eccentric to the center axis of the container, e.g. large blow-molded plastic bottles that have an oblong shape in cross-section with an integral handle.

Still other features and advantages of the invention are described or rendered obvious by the following detailed description of the invention which is to be considered together with the accompanying drawings.

BRIEF DESCRIPTION OF THE DRAWINGS

FIG. 3 is a side elevation of the same housing

FIG. 10 is a cross-sectional view of the clamp ring.

FIG. 11 is a bottom view of the dual beam unit.

FIGS. 12 and 13 are cross-sectional views taken along the lines 12-12 and 13-13 of FIG. 11.

DETAILED DESCRIPTION OF THE INVENTION

Figure 1:
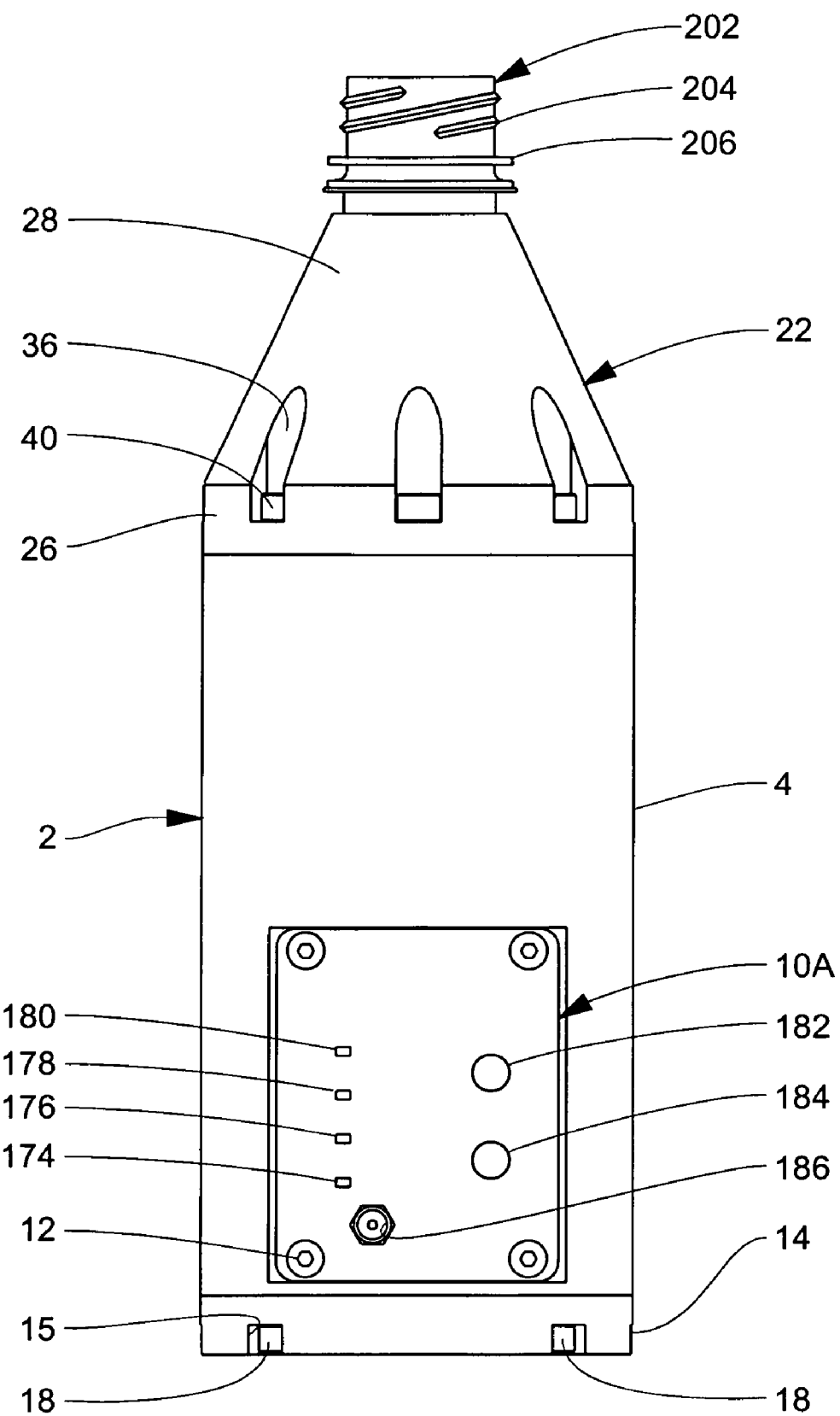
FIG. 1 is a side elevation of a preferred embodiment of the invention constituting a bottle shaped apparatus for measuring the torque with which a cap is applied to a bottle by a bottle capping machine.

Turning to FIGS. 1-4, a preferred embodiment of the invention has an external configuration simulating that of a 1 liter plastic bottle and comprises a housing 2 consisting of a hollow body 4 formed with open top and bottom ends. Adjacent its bottom end body 4 is formed with two diametrically opposed recesses 6 and two rectangular openings 8. Each opening 8 is concealed by a cover panel 10 which fits in the recess 6 and is attached to the hollow body by means of screws 12. One of the two cover panels 10A, the one shown in FIG. 1, is in the form of a flexible plastic laminate or membrane panel that embodies switches and LEDs, as described hereinafter in greater detail. With reference to FIGS. 1-4, 6 and 7, the bottom end of hollow body 4 is closed off by a bottom end member in the form of a circular plate 14. The latter is provided with a plurality of recesses 15 and openings 16 that accommodate screws 18 that screw into threaded openings 19 in the bottom end of hollow body 4 and thereby secure that plate to the hollow body.

Figure 2:
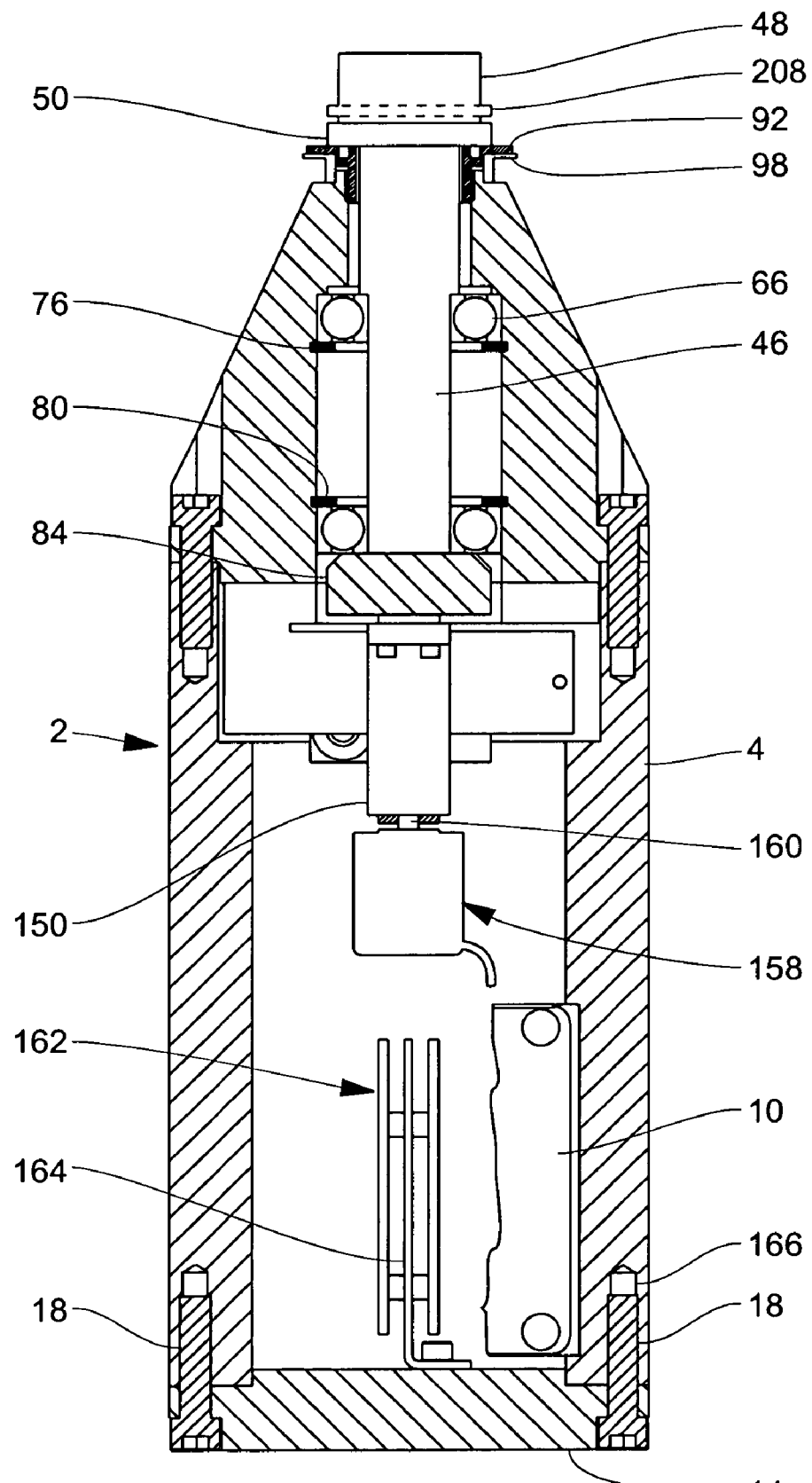
FIG. 2 is a longitudinal sectional view of the same apparatus, with certain portions being illustrated schematically.
Figure 3:
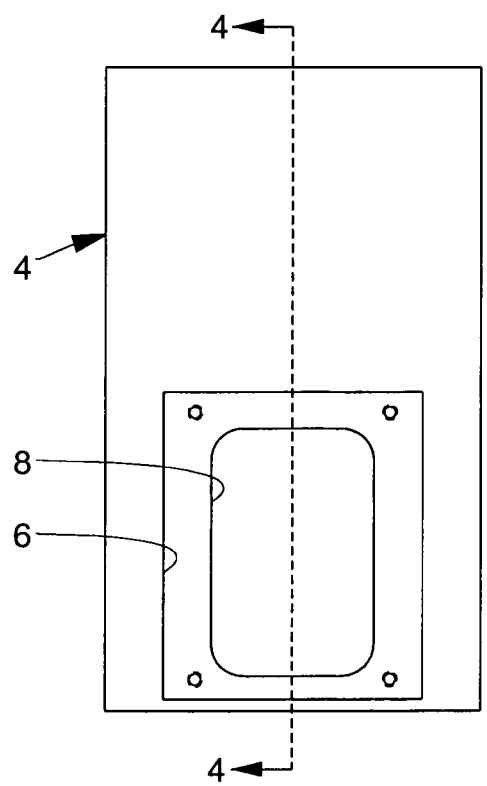
FIG. 3 is a longitudinal sectional view of the housing of the bottle shaped apparatus.
Figure 4:
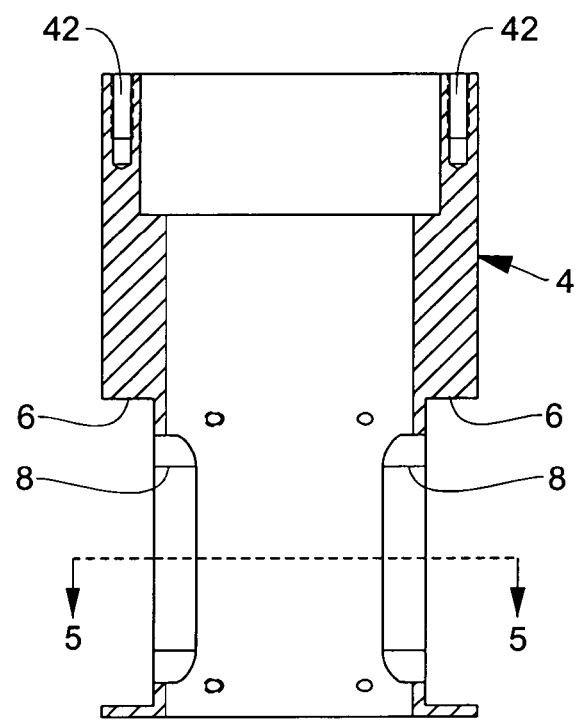
FIG. 4 is a longitudinal sectional view taken along line 4-4 of FIG. 3.
Figure 5:
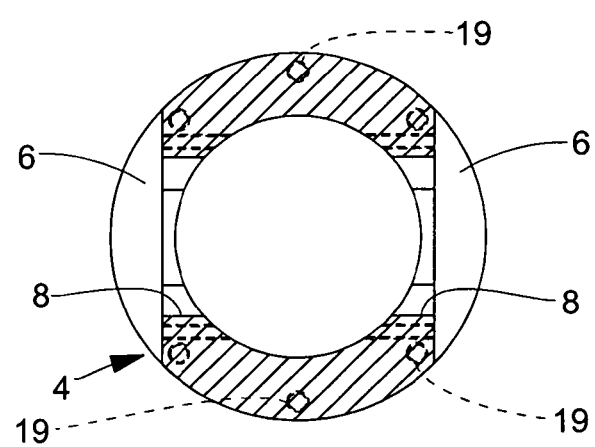
FIG. 5 is a cross-sectional view taken along line 5-5 of FIG. 4.
Figure 6:
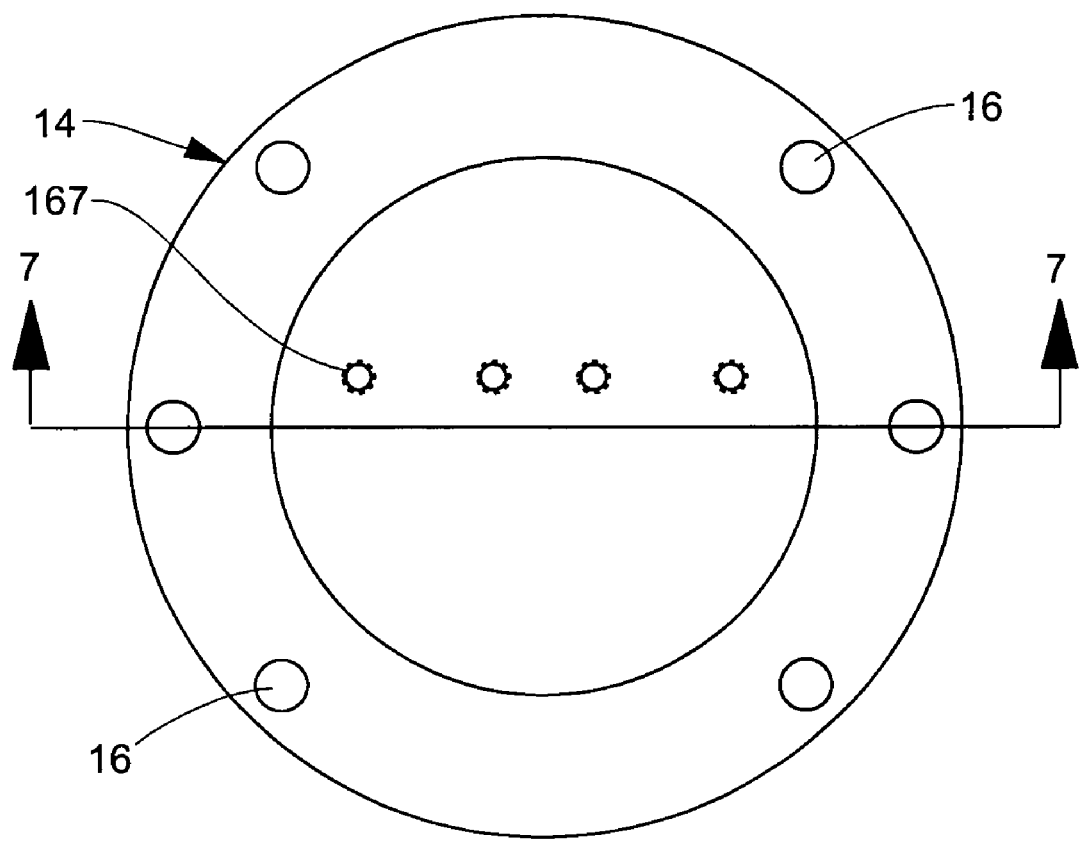
FIG. 6 is a plan view of the bottom closure for the housing.
Figure 7:
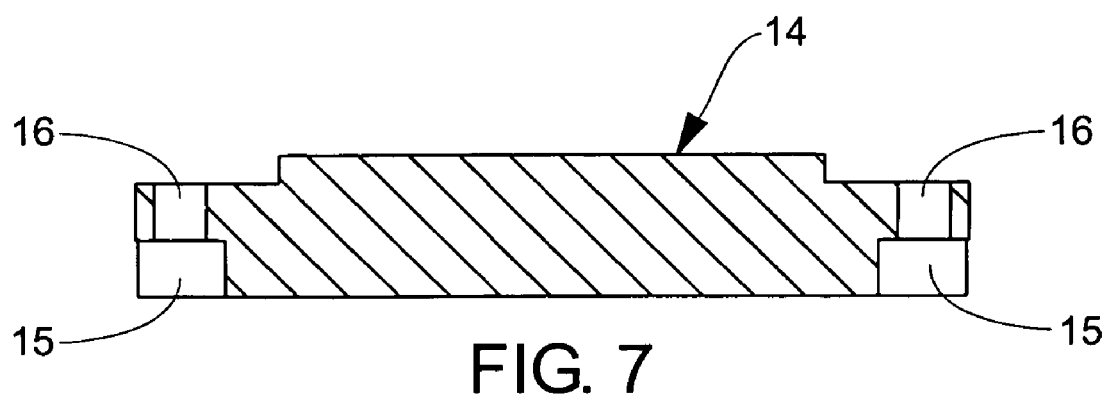
FIG. 7 is a cross-sectional view of the bottom end member for the housing.
Figure 8:
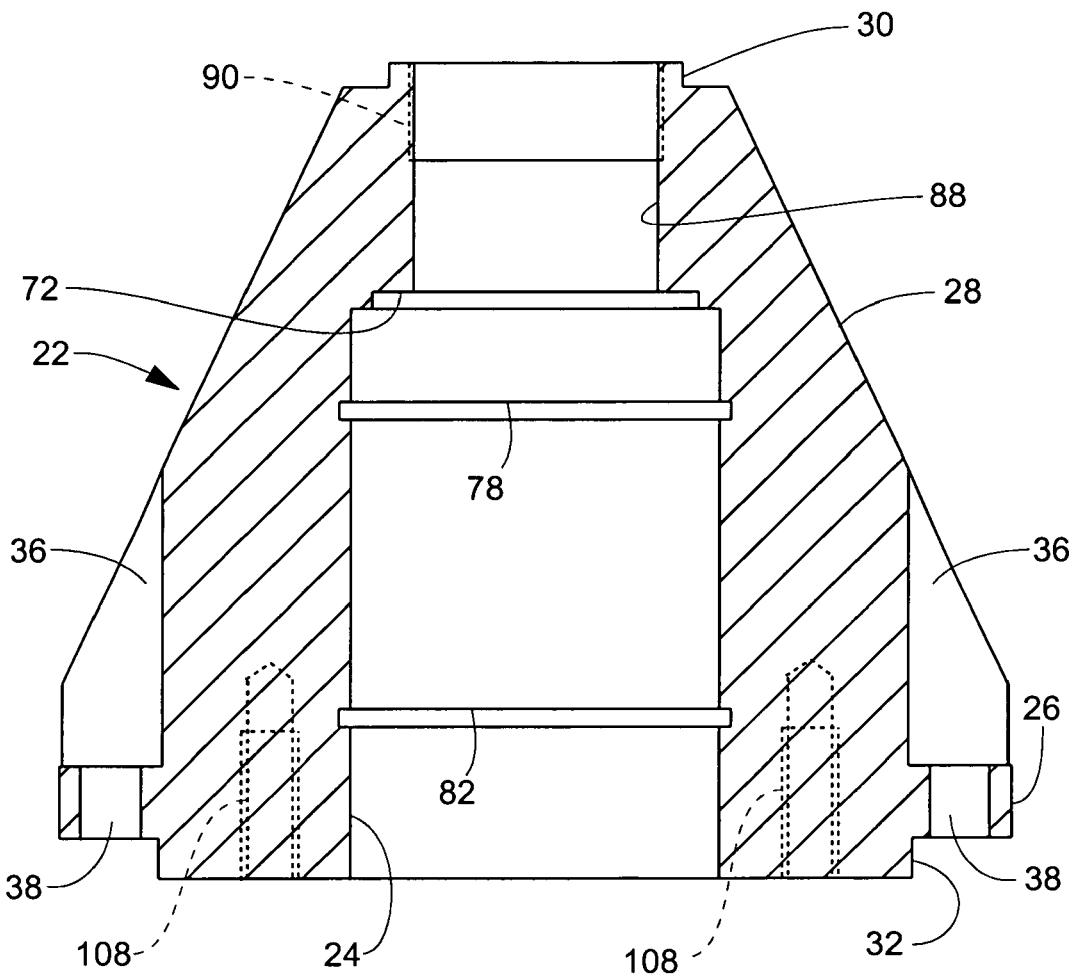
FIG. 8 is a longitudinal sectional view of the top end member for the housing.

Referring now that FIGS. 1, 2, and 8, attached to the upper end of hollow body 4 is a top end member 22 that has a central bore 24. The external surface of member 22 is characterized by a cylindrical bottom section 26, a conical intermediate section 28, and a short cylindrical top section 30. The bottom end of top end member to 22 has a reduced diameter section 32 that extends into the open top end of hollow body 4. Additionally top end member 22 has a number of external recesses 36 and holes 38 aligned with the recesses 36. Holes 38 accommodate screws 40 that are received in threaded holes 42 in the upper end of hollow body 4, whereby member 22 is releasably secured to body 4.

Figure 9:
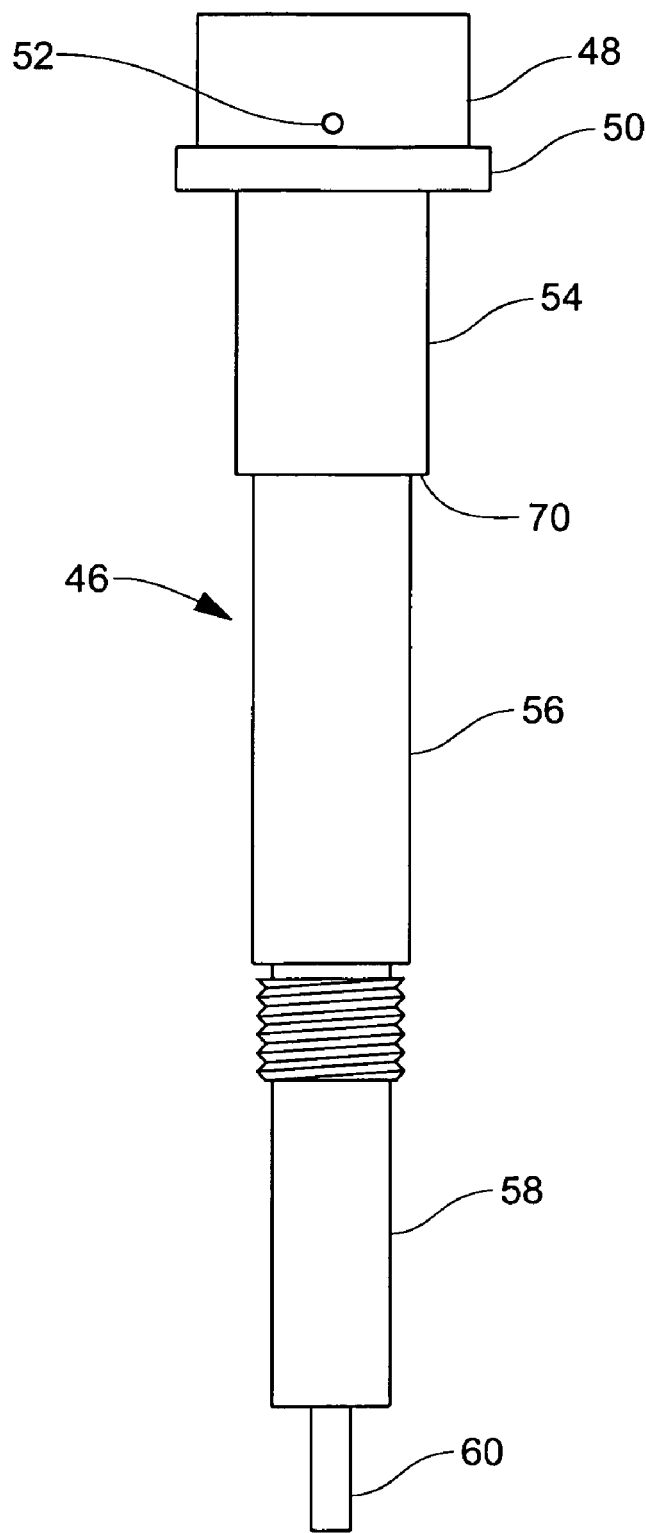
FIG. 9 is a side elevation of the torque-transmitting shaft of the same apparatus.

Mounted within the top end member 22 is a torque-transmitting shaft 46. As seen in FIG. 9, shaft 46 comprises an enlarged head 48 with a peripheral flange 50 at its bottom and. Head 48 has a diametrically-extending through hole 52 that is used to secure a an externally threaded member 210 (FIG. 1) whose function is explained hereinafter in the description of the use and mode of operation of the preferred embodiment of the invention. Shaft 46 has several different diameter sections, namely, sections 54, 56, 58 and 60. The reduced diameter section 58 is formed within an external screw thread 62. Referring to FIGS. 2, 8 and 9, shaft 46 is rotatably supported in top end member 22 by means of two ball bearing assemblies 66 and 68. The inner race of bearing assembly 66 engages a shoulder 70 formed by the junction of reduced diameter sections 54 and 56, while the outer race of that bearing assembly engages a shoulder 72 on the inner surface of end member 22. A retaining ring 76 received in a groove 78 in top end member 22 locks the outer race of bearing assembly 66 against axial movement. The second bearing assembly 68 has its outer race prevented from movement upwardly by a retaining range 80 that is received in a groove 82 in the upper end member. The inner race of bearing assembly 68 is retained against downward axial movement by a nut 84 that is screwed onto threaded section 62 of the shaft.

Referring now to FIGS. 2, 8 and 10, the upper end of bore 24 has a reduced diameter section 88 and that section is provided with an internal screw thread 90. A clamp ring 92 having a peripheral flange 94 and an external screw thread 96 is screwed into the reduced diameter section 88. Surrounding clamp ring 92 is a second ring 98 that surrounds the exterior surface of the cylindrical end section 30 of upper end member 22 and the enlarged cylindrical section 95 of clamp ring 92. Ring 98 is held tight against an end surface of upper end member 22 by the clamp ring. In this connection it should be noted that the flange 50 of the head of shaft 46 is disposed adjacent to the peripheral flange 94 of clamp ring 92, but does not engage the clamp ring so as not to impede rotation of the shaft.

Referring now to FIGS. 2, 8, 11-13 and 16, attached to the bottom end of the top end member 22 is a dual beam unit 100 that comprises a circular plate 102 having four holes 104 to accommodate screws 106 that screw into threaded holes 108 in the bottom end of top end member 22, whereby the dual beam unit is secured to that top end member. As seen in FIGS. 11-13 and 16, formed integral with the circular plate 102 is a U-shaped beam structure comprising a pair of beams 110A and 110B that are attached at one end to a bridge section 112. The bridge section is affixed to plate 102, while the beams are spaced from the plate. The result is that the two beams are disposed in cantilever relation to the supporting plate 102. Plate 102 has a circular hole 114 through which shaft 46 extends. Hole 112 is oversized with respect to shaft 46.

Figure 14:
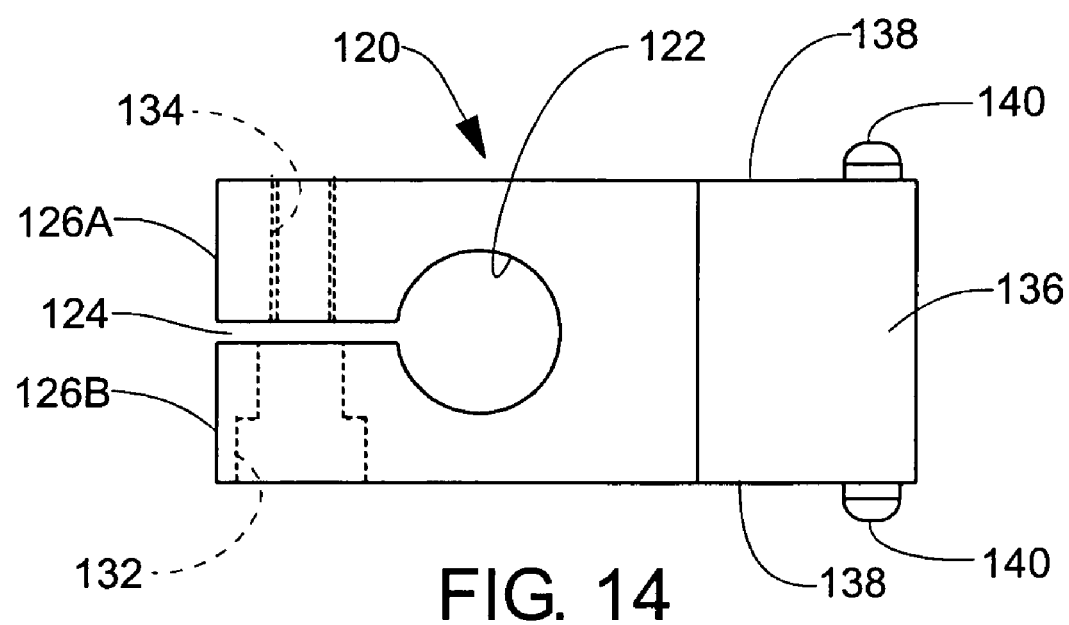
FIG. 14 is a plan view of the torque arm.
Figure 15:
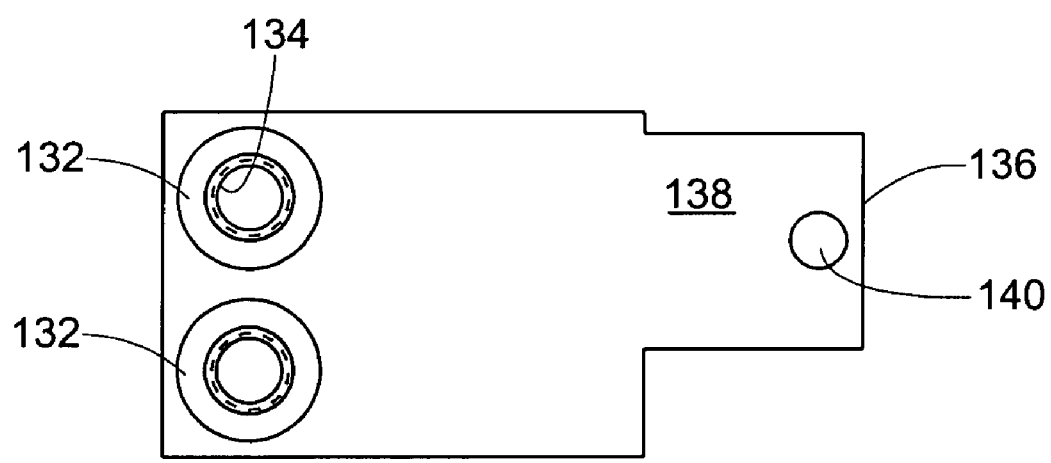
FIG. 15 is a side view of the same torque arm.
Figure 16:
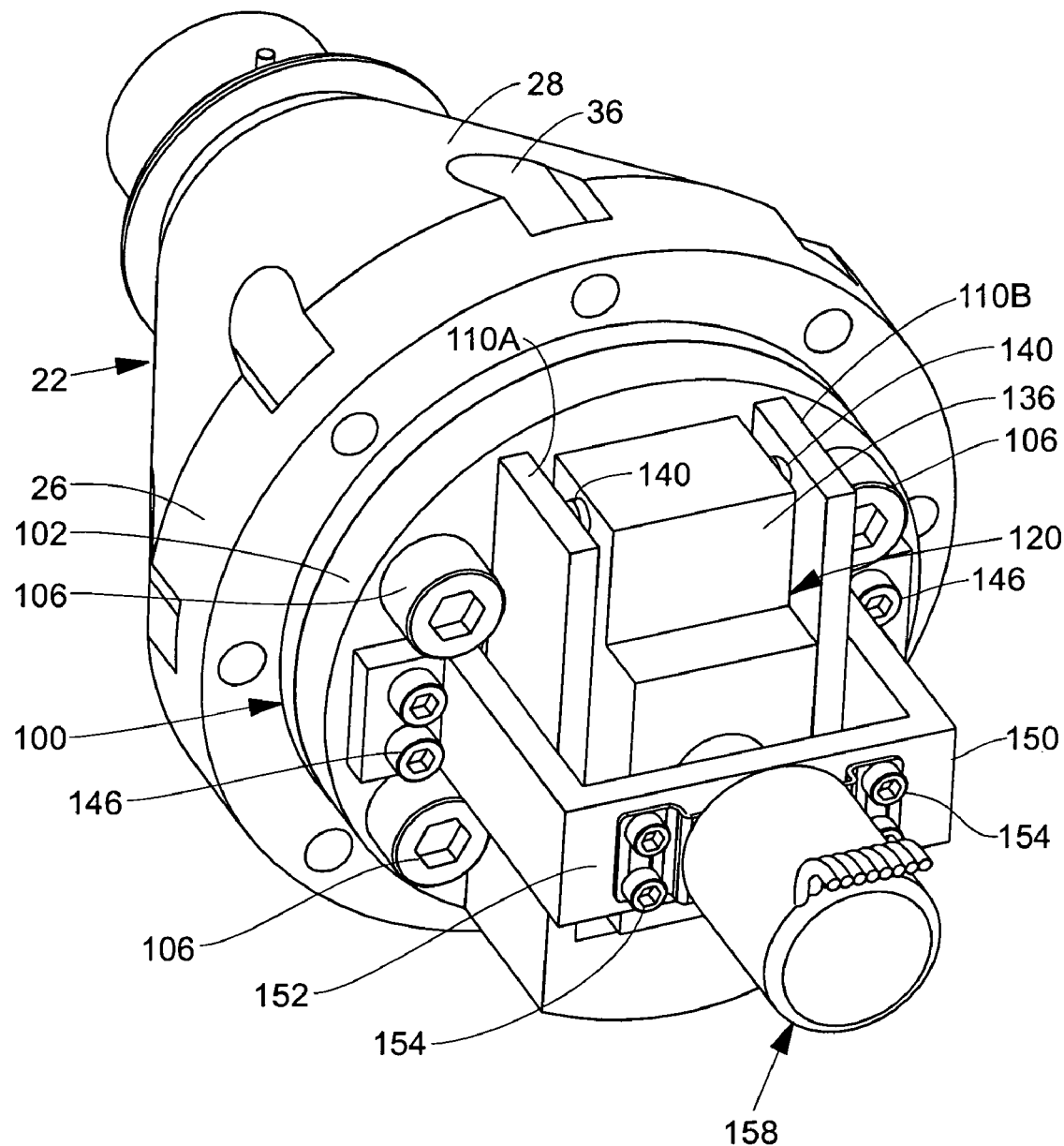
FIG. 16 is perspective view illustrating how the encoder is mounted to the beam assembly.

Referring now to FIGS. 14, 15 and 16, attached to the section 58 of shaft 46 is a torque arm 120. The arm 120 has a center hole 122 and one end of the arm is provided with a slot 124 that intersects center hole 122, essentially rendering arm 120 bifurcated with opposed arm sections 126A and 126B on one side of center hole 122. A pair of vertically spaced holes 130 are formed in arm section 126A, and a pair of vertically spaced holes 132 are formed in arm section 126 B in alignment with holes 130. The holes 130 in arm section 126A are formed with screw threads 134. Screws (not shown) pass through holes 132 and are screwed into holes 130 so as to bring arm sections 126A and 126B together and thereby clamp torque arm 120 to shaft 46. In the illustrated embodiment, the opposite end of torque arm 120 is notched to form a smaller end section 136 and the opposite flat sides 138 of end section 136 are formed with holes that receive pins 140 having hemispherical end surfaces (FIG. 14).

As seen best in FIG. 16, torque arm 120 extends between the two beams and when the apparatus is at rest, the hemispherical end surfaces of pins 140 make a light or near point contact with the two beams. When the shaft 46 is rotated as a result of torque being applied to its head 48, the torque arm will apply a flexing force to one or the other of the two beams depending on the direction of rotation of the shaft, with the hemispherical end surface of one of the pins 140 beam assuring a point contact engagement of the torque arm with the beam being flexed. The dual beam unit is made of a suitable material, preferably a metal or metal alloy, which renders the two beams relatively stiff but capable of flexing under the force exerted thereon by the torque arm, with each beam returning to its original unflexed position when the force applied thereto by the torque arm is released. Consequently when the torque applied to the shaft is terminated, the flexed beam will return to its unflexed position and in so doing it will force torque arm 120 back to its neutral center position.

Referring again to FIGS. 2, 11 and 16, the circular base 102 of the dual beam unit is provided with some additional threaded holes 144 that receive screws 146 that serve to secure a U-shaped bracket 150 to base 102. Releasably attached to the center section 152 of bracket 150 by screws 154 is an optical encoder device 158. The latter has an input shaft 160 that passes through a center hole in the center section 152 of bracket 150 and is coupled to the end section 60 of shaft 46, whereby rotation of shaft 46 will cause rotation of the input shaft of the encoder. Encoder 158 has an electrical output section that is connected by a cable harness 160 (FIG. 16) to an electronic assembly 162 that is attached to and supported by a bracket 164, Screws 166 screwed into blind threaded holes 167 secure bracket 164 to bottom end member 14. In the preferred embodiment of the invention, encoder 158 is an optical encoder that provides two phase-displaced series of rectangular pulses as the input shaft of the encoder is rotated in response to rotation of torque shaft 46. By way of example but not limitation, the encoder may be a Model R119 rotary incremental optical encoder made by Gurley Precision Instruments of Troy, N.Y.

Figure 17:
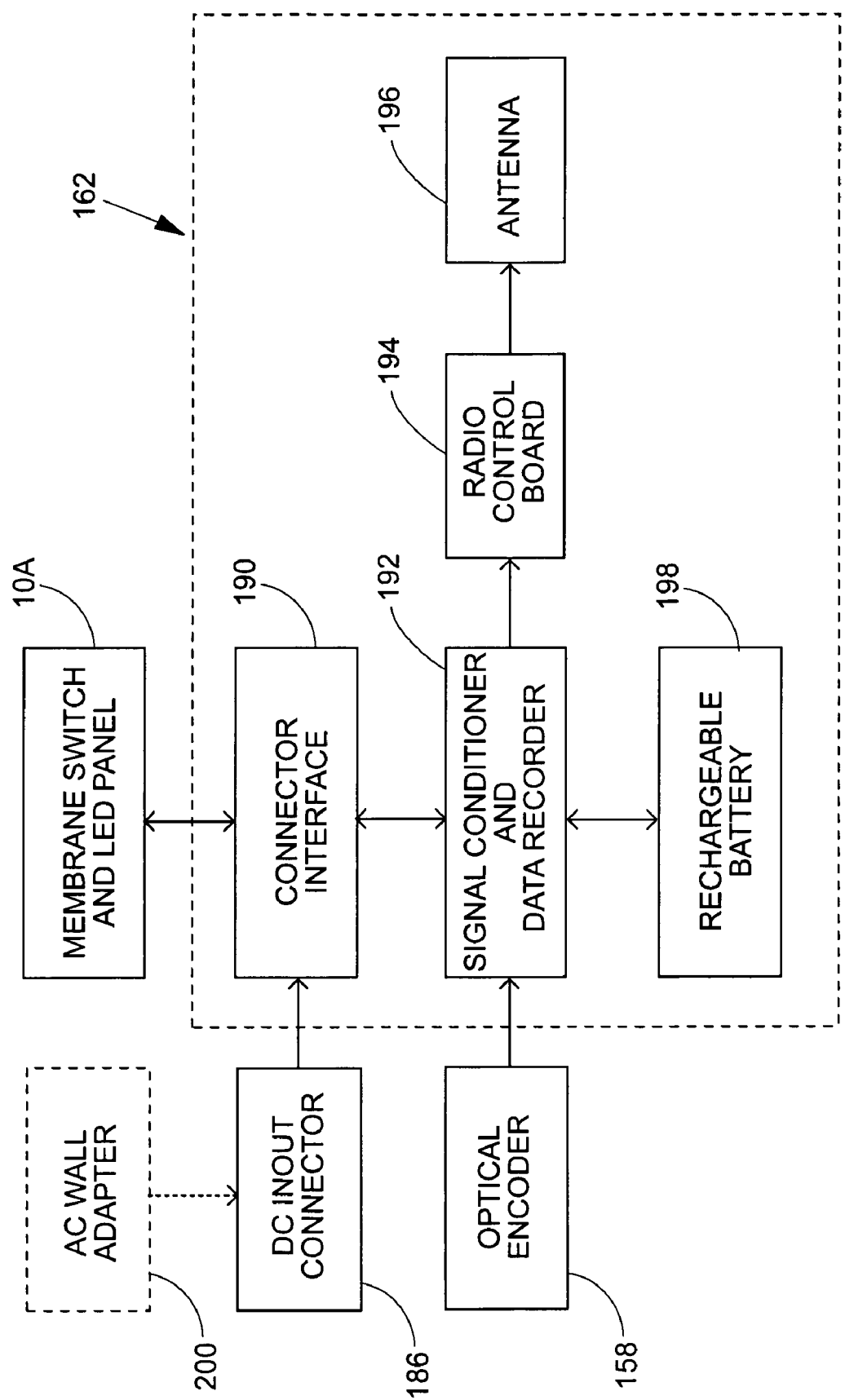
FIG. 17 is a block diagram illustrating the electronic components of the apparatus.

Referring to FIGS. 1 and 17, as noted above, one of the cover panels 10 is in the form of a flexible laminated plastic membrane switch and LED panel that comprises two tactile (i.e., touch-actuated) switches 182 and 184 and includes a plurality of LEDs 174, 176 and 178 and a coaxial cable connector 186. The electronic assembly 162 comprises a connector interface board 190 that serves to interface the components of the plastic membrane switch and LED panel 10 and the coaxial connector 186 to other components of the electronic assembly 162, namely, a signal conditioner/programmable data recorder 192, a wireless transmitter comprising a radio control board 194 and an antenna board 196, and a rechargeable battery 198.

The signal conditioner/data recorder 192 includes a counter and real time clock and operates to (a) process the signal output of the encoder into a digital data form that provides an encoder shaft angle position versus time profile, and (b) store the processed data for subsequent transfer to the wireless transmitter for transmittal to a remote receiver. The signal conditioner/data recorder 192 is programmed to record the processed torque data derived from the encoder output when the counter has accumulated a first preset minimum number of shaft position values represented processed torque data and to transfer that torque data to the radio control board when a second preset number of shaft position values have been stored by the counter. In addition to transmitting the processed data the radio control board is programmed to wirelessly transmit a unique identifier code that serves to identify the apparatus of which it is part, whereby the torque measurement data that it wirelessly transmits to a remote receiver may be distinguished from the torque measurement data output of another like torque measuring apparatus.

Tactile switch 182 serves as the power on/off switch for the apparatus, acting through the connector interface 190 to couple electrical power from the battery to the other electrical components, including encoder 158. Tactile switch 194 is coupled by connector interface 190 to radio board 194 and acts to cause the transmitter to act as a gateway to transmit a predetermined identifier code which is unique to the particular apparatus generating the unique identifier code, thereby allowing a remote receiver and data processing apparatus to distinguish transmitted torque data generated by the illustrated apparatus from torque date generated by other like apparatus. LED 174 is energized when switch 182 is depressed to power up the apparatus, thereby providing an indication that the apparatus is ready for use. LED 176 is energized when the radio control board is receiving power from the battery. LED 178 is energized when radio board 194 and antenna 196 are transmitting torque data to a remote receiver. LED 180 is energized when the battery is being recharged. In this connection, as shown in FIG. 17, the coaxial connector 186 is provided so as to permit connection via a coaxial male cable connector and cable (not shown) to a conventional so-called "AC wall adapter" (represented schematically at 200 in FIG. 17) which is designed to be plugged into an AC wall outlet and to convert AC voltage to a positive DC voltage, e.g., +5 V, whereby the battery may be recharged. Such converters are well known.

The torque measuring device is adapted for attachment of a tamper-evident screw cap by fitting over the head 48 of shaft 46 an externally threaded sleeve 202 which preferably constitutes the cut-off threaded mouth portion of the neck of one of the 1 liter beverage bottles. Thus sleeve 202 has a screw thread 204 to accommodate the screw section of a tamper-evident screw cap and a retaining flange 206 which retains the tamper-evident band portion of the cap. The sleeve is secured to head 48 by a providing it with two diametrically opposed holes, positioning the sleeve so that those holes are aligned with hole 52 in head 48, and securing the sleeve to the shaft by inserting a pin 208 threw the holes in sleeve 202 and the through hole 52 in head 48. Alternatively sleeve 202 may be a separately formed facsimile of the threaded mouth portion of the bottle, with such facsimile preferably differing in that it has a top end wall which sits on the top end surface of shaft 46 and has holes therein to accommodate screws that fasten it to the shaft.

Apparatus embodying the invention also may be adapted for use in measuring the torque with which screw caps are applied to containers that do not have the generally cylindrical shape of carbonated beverage bottles, e.g., containers that have a non-circular cross-sectional shape, or where, for example, the spout (mouth) of the container is eccentric to the center axis of the container. In such case, the housing of the torque measuring apparatus may emulate the shape of the non-cylindrical containers or have a different non-conforming shape. In the latter instance, an adapter device characterized as a "boot" is provided that has an exterior shape corresponding to the exterior shape of the non-cylindrical container and an interior shape that will snugly accommodate the non-conforming shaped housing of the torque measuring apparatus and lock it against rotation or lateral movement in the boot so that its torque shaft 46 will be aligned axially with the capping head of the capping machine.

It is contemplated that the torque data generated and transmitted by the above-described torque measuring apparatus will be received by a remote receiver (gateway) that is connected to a microprocessor, preferably in the form of a standalone computer, that is programmed to process and evaluate the torque data. Multiple like devices embodying the present invention may be employed of in the same capping machine, with their torque data output being transmitted to the same remote receiver. Because each of the devices at transmits its unique identifier code, the remote receiver and/or microprocessor can be programmed to distinguish the data received from each torque measuring device from the data received from the other torque measuring devices and to ignore any data that is not validated by a unique identifier code.

Use of the above-described "measurement bottles" will now be described in connection with measuring the torque with which screw caps are to be applied to 1 liter beverage bottles by a capping machine. It is contemplated that in some instance, the torque with which a capping machine applies screw caps to containers may be evaluated by deploying a plurality of the above-described torque measuring devices on the conveyor of the capping machine, so that each device will generate its own evaluation of the performance of the capping head. However, to simplify matters, the following description involves only one such torque measuring device.

Use of the torque measuring apparatus hereinabove described is initiated by depressing the switches 182 and 184. Depressing switch 182 activate the device. Upon being activated, the position counter in the signal conditioner/data recorder 192 will be set to zero. Closing switch 184 activates the transmitter so as to cause it to transmitter the unique identifier code, either as a separate operation preceding any toque date transmittal or as part of a data transmission. Next a cap is applied to the threaded sleeve 202. As this occurs, shaft 46 will turn under the torque transmitted to it from the capping head via the cap that is being applied. The encoder will generate pulses in response to rotation of shaft 46. The signal conditioner/data recorder 192 counts the encoders output signal pulses, converts those pulses to digital data, and then stores that data. The signal conditioner/data recorder may condition and store encoder signal pulses as soon as those output signal pulses begin to occur. Preferably however, the recorder does not begin to record data until a preset position counter (torque) value is reached. Thereafter a preprogrammed number of position values will be stored by the recorder. After the desired number of position values has been stored, the apparatus will automatically transmit that block of data wirelessly to the remote receiver. Once the transmission has been completed, the apparatus will automatically turn itself off. The remote receiver, acting as a gateway, will transmit the received block of data to a microprocessor that is programmed to store and evaluate the data.

The present invention provides a significant advantage in its ability to transfer data wirelessly. A further advantage is that the torque measuring device embodying this invention is relatively simple and its housing may have various shapes corresponding to the shapes of the bottles or other containers that receive screw caps for which torque measurements are desired. Another advantage is that the mechanical and electronic construction of the apparatus may be modified according to cost and intended use without departing from the fundamental novel aspects of the invention. Still other advantages will be obvious to persons skilled in the art.

What is claimed is:

1. Apparatus for measuring torque comprising:
   a hollow housing having top end and bottom ends and means closing off said top and bottom ends thereof;
   a torque-transmitting shaft rotatably mounted in said housing, said shaft having a top end and a bottom end with said top end thereof projecting out of said top end of said housing;
   first and second parallel beams mounted in cantilever fashion in said housing, with said shaft extending between said first and second beams;
   a force-transmitting arm having a first end attached to said shaft so as to rotate there with and a second end extending between and adjacent to said beams so that rotation of said arm will cause deflection of one or the other of said beams depending upon the door direction of rotation of said arm, each of said beams having the capability when bent of applying a restoring force to said arm and said shaft;
   an encoder having a rotatable input member coupled to said shaft so that rotation of said shaft will cause rotation of said encoder input member, said encoder being adapted to generate signals representative of the angle through which the rotatable input member of the encoder is rotated in response to rotation of said shaft;
   electronic means mounted within said housing and coupled to said encoder for receiving said signals and generating an electrical output representative of said signals;
   a wireless transmitter coupled to said electronic means for transmitting said in electrical output wirelessly to a remote receiver; and
   means on said top end of said shaft for supporting and securing a facsimile of the threaded mouth of a container, whereby when said apparatus is placed in a container capping machine in position for a screw cap to be rotatively applied to said facsimile, the torque with which the machine rotatively applies the screw cap to the facsimile will cause said shaft to rotate in accordance with said torque.

2. Apparatus according to claim 1 wherein said housing is formed with open top and bottom ends, and further wherein said means comprise first and second separately formed end members closing off said open top and bottom ends respectively of said housing.

3. Apparatus according to claim 2 wherein said first and second end members are releasably secured to said top and bottom ends of said housing, and further wherein said beams are mounted to said first member.

4. Apparatus according to claim 3 wherein said beams form part of a beam assembly that comprises a base member that is attached to said first member.

5. Apparatus according to claim 3 wherein said encoder comprises a housing and said encoder housing is attached to said base member by a bracket.

6. Apparatus according to claim 1 wherein said arm has first and second side surfaces confronting said first and second beams respectively and each of said side surfaces has a hemi-spherical projection that makes a point contact with an adjacent beam.

7. Apparatus according to claim 1 wherein said encoder input member is coupled to said bottom end of said shaft.

8. Apparatus according to claim 1 further including a facsimile of the threaded mouth of a container attached to said top end of said shaft.

9. Apparatus according to claim 2 further including a facsimile of the threaded mouth of a container attached to said top end of said shaft, and further wherein said housing, said first and second end members and said facsimile coact to simulate a bottle having a screw threaded mouth.

10. Apparatus according to claim 9 wherein said facsimile has a screw thread on its exterior.

11. Apparatus according to claim 9 wherein said first end member has a conical shape with a bottom end having a diameter substantially the same as the outer diameter of said housing and a top end having an opening through which extends the upper end of said torque transmitting shaft.

12. Apparatus according to claim 2 wherein said first and second beams form integral parts of a beam assembly that also comprises a base plate to which said beams are attached, and further wherein first and member has a bottom surface and said base plate of said beam assembly is attached to said bottom surface of said first end member.

13. Apparatus according to claim 2 wherein said electronic means, including said transmitter means, is attached to said second end member.

14. Apparatus for measuring the torque with which a screw cap is attached to the threaded mouth of a container by a capping machine, said apparatus comprising:

a housing having a top end and a bottom end;

first and second means closing off said top and bottom ends respectively of said housing, at least said first mans comprising a top end member removably attached to said top end of said housing, with said top end member having a hole;

a torque-transmitting shaft having an upper end and a lower end with said lower end extending into said housing and said upper end extending through said hole and protruding upwardly from said top end member;

means attached to said top end member for rotatably supporting said shaft for rotation in said hole relative to said top end member and said housing;

a beam assembly disposed within said housing, said beam assembly comprising a base and a pair of flexible beams attached to said base in cantilever fashion, said base being secured to said top end member and said beams being in parallel mutually-spaced relationship with one another;

a force-transmitting arm mounted to said shaft so as to rotate therewith, said arm extending radially from said shaft between said beams so that rotation of said arm by said shaft will cause deflection of one or the other of said beams depending upon the direction of rotation of said arm and shaft, each of said beams having the capability when bent of supplying a restoring force to sit arm and shaft;

an adapter coaxially secured to said upper end of said shaft, said adapter comprising a facsimile of the threaded mouth of a selected container, whereby when said apparatus is placed in a container capping machine in position for a screw cap to be rotatively applied to said adapter, the torque with which the machine rotatively applies the screw cap to the adapter will cause said shaft to rotate in accordance with said torque;

an encoder mounted within said housing, said encoder having a rotatable input member shaft that is coupled to said shaft whereby said encoder input member will rotate with said shaft; said encoder being constructed so as to generate electric signal pulses in response to rotation of said shaft;

electronic circuit means including means coupled to said encoder for receiving and processing said signal pulses and a transmitter for wirelessly transmitting said processed signal pulses to a receiver located externally of and separate from said apparatus.

15. Apparatus according to claim 14 wherein said electronic circuit means includes means for transmitting a unique identifier code for said apparatus to said remote receiver.

16. Apparatus according to claim 14 wherein said wherein said electronic circuit means comprises means for counting and storing said processed signal pulses, and means for transferring said stored processed signal pulses to said transmitter.

17. Apparatus according to claim 16 further wherein said electronic circuit means is programmed to transfer said stored processed pulses to said transmitter after a predetermined number of said processed pulses have been counted.

18. Apparatus according to claim 14 wherein said electronic circuit means processes said signal pulses by converting said signal pulses to digital data.

\* \* \* \* \*

UNITED STATES PATENT AND TRADEMARK OFFICE
CERTIFICATE OF CORRECTION

PATENT NO.         : 7,481,122 B2
APPLICATION NO.    : 11/974532
DATED              : January 27, 2009
INVENTOR(S)        : Robert F. Searle It is certified that error appears in the above-identified patent and that said Letters Patent is hereby corrected as shown below:

Column 8, claim 1, line 32, delete "in";

Column 9, claim 12, line 16, change "and" (second occurrence) to -- end --;

Column 9, claim 14, line 27, change "mans" to -- means --;

Column 10, claim 14, line 7, change "sit" to -- said --; and

Column 10, claim 16, line 31, delete "wherein said" (first occurrence).

Signed and Sealed this

Twenty-sixth Day of January, 2010

David J. Kappos
*Director of the United States Patent and Trademark Office*